United States Patent
Harris, III et al.

(10) Patent No.: US 9,731,816 B2
(45) Date of Patent: Aug. 15, 2017

(54) MULTI-POSITION LANDING GEAR

(71) Applicant: The Boeing Company, Chicago, IL (US)

(72) Inventors: John H. Harris, III, Media, PA (US); Daniel I. Newman, Lafayette Hill, PA (US)

(73) Assignee: The Boeing Company, Chicago, IL (US)

(*) Notice: Subject to any disclaimer, the term of this patent is extended or adjusted under 35 U.S.C. 154(b) by 44 days.

(21) Appl. No.: 14/562,934

(22) Filed: Dec. 8, 2014

(65) Prior Publication Data
US 2016/0159468 A1   Jun. 9, 2016

(51) Int. Cl.
*B64C 25/14* (2006.01)
*B64C 25/36* (2006.01)
*B64C 25/52* (2006.01)
*B64C 25/66* (2006.01)
*B64C 29/00* (2006.01)

(52) U.S. Cl.
CPC ............ *B64C 25/14* (2013.01); *B64C 25/36* (2013.01); *B64C 25/52* (2013.01); *B64C 25/66* (2013.01); *B64C 29/0025* (2013.01); *B64C 2201/088* (2013.01)

(58) Field of Classification Search
CPC ....... B64C 25/001; B64C 25/52; B64C 25/10; B64C 25/32; B64C 25/36; B64C 25/14; B64C 2025/008
USPC .............. 244/100 R, 102 R, 102 A, 108, 109
See application file for complete search history.

(56) References Cited

U.S. PATENT DOCUMENTS

| | | | | |
|---|---|---|---|---|
| 1,362,292 A | * | 12/1920 | Gunderson | B64C 35/00 144/24.12 |
| 1,884,596 A | * | 10/1932 | De La Cierva | B64C 25/06 244/109 |
| 2,382,460 A | * | 8/1945 | Young | B64C 29/02 244/17.19 |
| 2,578,578 A | | 12/1951 | Francis | |
| 2,622,826 A | * | 12/1952 | Prince | B64C 29/02 244/17.21 |
| 2,678,783 A | * | 5/1954 | Myers | B64C 29/0091 244/102 R |
| 2,794,609 A | * | 6/1957 | Perry | B64C 25/48 137/636 |
| 2,868,477 A | * | 1/1959 | Chaplin | B64C 29/0091 244/100 R |

(Continued)

FOREIGN PATENT DOCUMENTS

FR  2 993 245  1/2014
FR  3 000 022  6/2014

(Continued)

OTHER PUBLICATIONS

European Patent Office, Extended European Search Report, EP 15 19 6209 (dated May 9, 2016).

*Primary Examiner* — Benjamin P Lee
(74) *Attorney, Agent, or Firm* — Walters & Wasylyna LLC

(57) ABSTRACT

A multi-position landing gear for an aircraft may include a first landing skid disposed on a bottom side of the aircraft, and a second landing skid disposed on one of a top side or the bottom side of the aircraft, wherein the first landing skid and the second landing skid are rotatable relative to the aircraft.

20 Claims, 14 Drawing Sheets

(56) References Cited

U.S. PATENT DOCUMENTS

| | | | | |
|---|---|---|---|---|
| 3,096,952 | A * | 7/1963 | Roppel | B64C 29/0075 244/12.4 |
| 3,142,455 | A * | 7/1964 | Wilford | B64C 29/02 244/7 B |
| 3,173,632 | A | 3/1965 | Woods | |
| 3,387,802 | A | 6/1968 | Cruz | |
| 3,420,472 | A * | 1/1969 | Jacques | B64C 29/0091 244/17.19 |
| 4,037,807 | A * | 7/1977 | Johnston | B64C 29/02 244/12.1 |
| 5,056,737 | A * | 10/1991 | Taylor | B64C 25/66 244/100 R |
| 5,062,587 | A | 11/1991 | Wernicke | |
| 5,395,073 | A * | 3/1995 | Rutan | B64C 3/385 244/38 |
| 5,863,013 | A * | 1/1999 | Schmittle | B64C 3/385 244/104 LS |
| 6,502,787 | B1 * | 1/2003 | Barrett | A63H 27/12 244/23 A |
| 7,118,066 | B2 * | 10/2006 | Allen | B64C 5/06 244/7 B |
| 8,167,234 | B1 * | 5/2012 | Moore | B64C 37/00 244/17.23 |
| 8,342,440 | B2 * | 1/2013 | Papanikolopoulos | A63H 27/12 244/17.11 |
| 8,505,846 | B1 * | 8/2013 | Sanders, II | B64C 11/003 244/7 A |
| 9,004,393 | B2 * | 4/2015 | Barrett-Gonzales | B64C 27/24 244/14 |
| 2004/0200924 | A1 * | 10/2004 | Clark, Jr. | A63H 27/12 244/7 B |
| 2011/0049293 | A1 * | 3/2011 | Koletzko | B64C 25/52 244/102 A |
| 2012/0097801 | A1 * | 4/2012 | Barrett | B64C 27/24 244/7 A |
| 2013/0233970 | A1 * | 9/2013 | Cottet | B64C 25/52 244/109 |
| 2014/0339354 | A1 * | 11/2014 | Gaillimore | B64C 39/12 244/12.4 |

FOREIGN PATENT DOCUMENTS

| | | |
|---|---|---|
| GB | 726 573 A | 3/1955 |
| GB | 2 229 985 A | 10/1990 |

\* cited by examiner

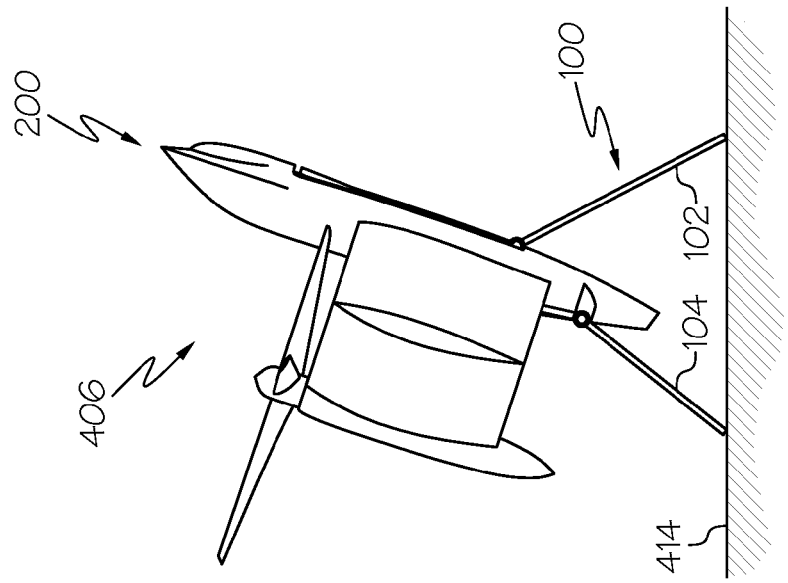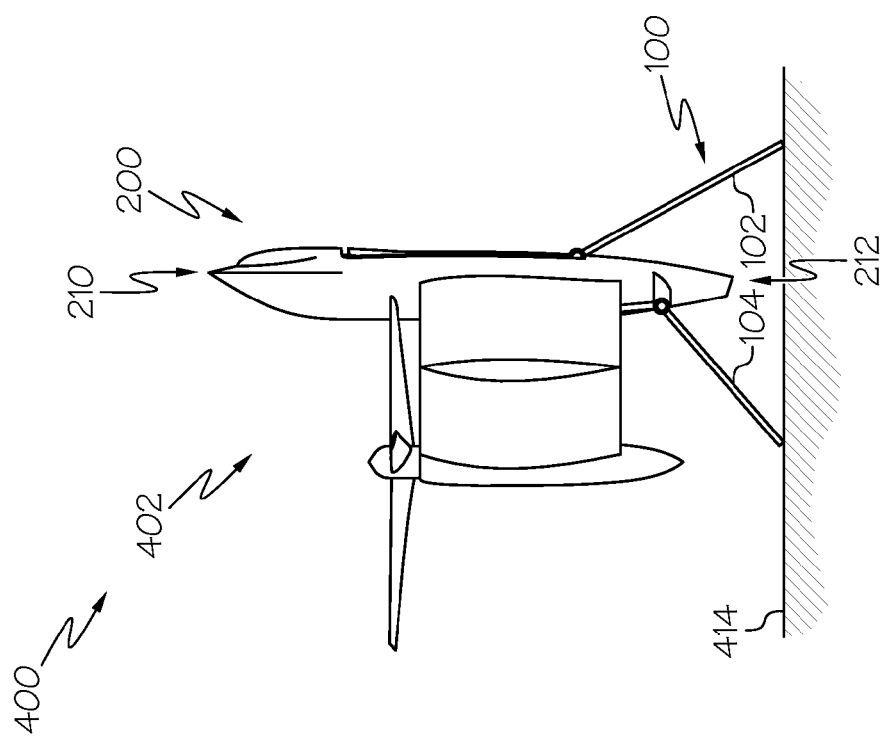

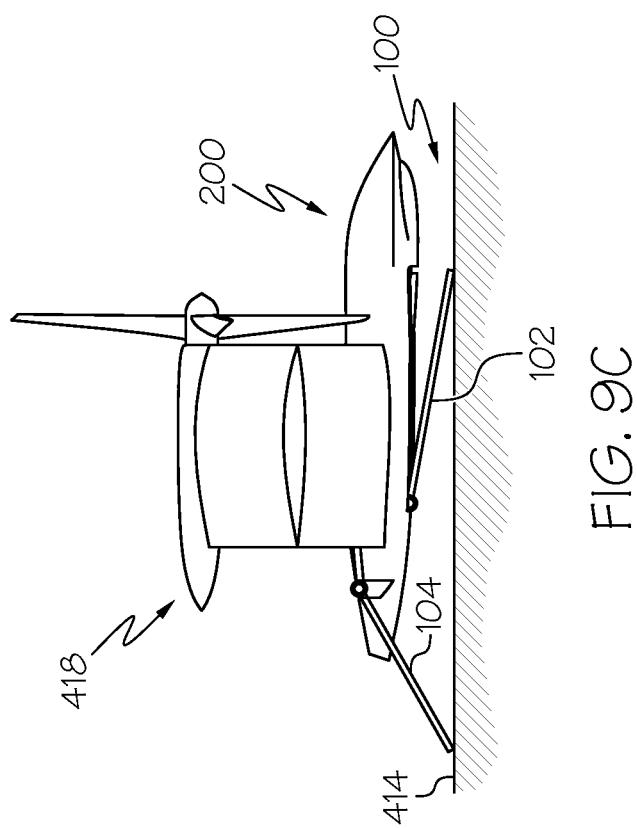

MULTI-POSITION LANDING GEAR

FIELD

The present disclosure is generally related to aircraft and, more particularly, to multi-position landing gear for aircraft.

BACKGROUND

Landing gear usually supports an aircraft when it is not flying, allowing it to take off, land, refuel, be maintained, and taxi. Typical landing gear includes wheels, skids, skis, floats or a combination of these and other elements depending on both the surface and on whether the aircraft operates vertically (e.g., vertical takeoff and landing "VTOL") or is able to taxi along the surface. Landing gear may be fixed in a single position or capable of retraction and deployment, as required. Faster aircraft usually have a retractable undercarriage (e.g., the landing gear of the aircraft is housed within wheel wells during flight), which folds away during flight to reduce air resistance or drag. Conventional takeoff and landing ("CTOL") aircraft typically have wheels to facilitate rolling during takeoff and landing.

However, typical landing gear supports the aircraft in only a single orientation or with slight adjustments in height and/or angle. For example, landing gear skids (e.g., on a rotorcraft or fixed-wing aircraft) or landing gear wheels (e.g., on a fixed-wing aircraft) are designed to be used only when the aircraft is in a specific orientation. If an aircraft is intended to be positioned or stored in multiple positions, such as an aircraft that takes off using a runway but lands vertically (e.g., in a tail-sitter orientation), multiple sets of landing gear are needed.

Additionally, transitioning the aircraft between sets of landing gear can be difficult. For example, large external support equipment (e.g., jacks or overhead cranes) is often required to reposition the aircraft. While this sort of equipment is traditionally available in a maintenance hangar or other support facility, it is not likely to be available when the aircraft is deployed in the field.

Accordingly, those skilled in the art continue with research and development efforts in the field of aircraft landing gear.

SUMMARY

In one embodiment, the disclosed multi-position landing gear for an aircraft may include a first landing skid disposed on a bottom side of the aircraft, and a second landing skid disposed on one of a top side or the bottom side of the aircraft, wherein the first landing skid and the second landing skid are rotatable relative to the aircraft.

In another embodiment, the disclosed aircraft may include a fuselage including a longitudinal axis, a top side and a bottom side, wings extending from the fuselage, at least one engine coupled to at least one of the fuselage and the wings, a first landing skid rotatably coupled to the bottom side of the fuselage, and a second landing skid rotatably coupled to one of the top side or the bottom side of the fuselage.

In yet another embodiment, the disclosed method for transitioning an aircraft between a plurality of orientations may include the steps of: (1) positioning the aircraft in a first orientation supported by a multi-position landing gear, the multi-position landing gear including a first landing skid disposed on a bottom side of the aircraft and a second landing skid disposed on one of a top side or the bottom side of the aircraft, (2) rotating the first landing skid relative to the aircraft, (3) rotating the second landing skid relative to the aircraft, and (4) positioning the aircraft in a second orientation.

Other embodiments of the disclosed aircraft, multi-position landing gear and associated methods will become apparent from the following detailed description, the accompanying drawings and the appended claims.

DETAILED DESCRIPTION

Figure 1:
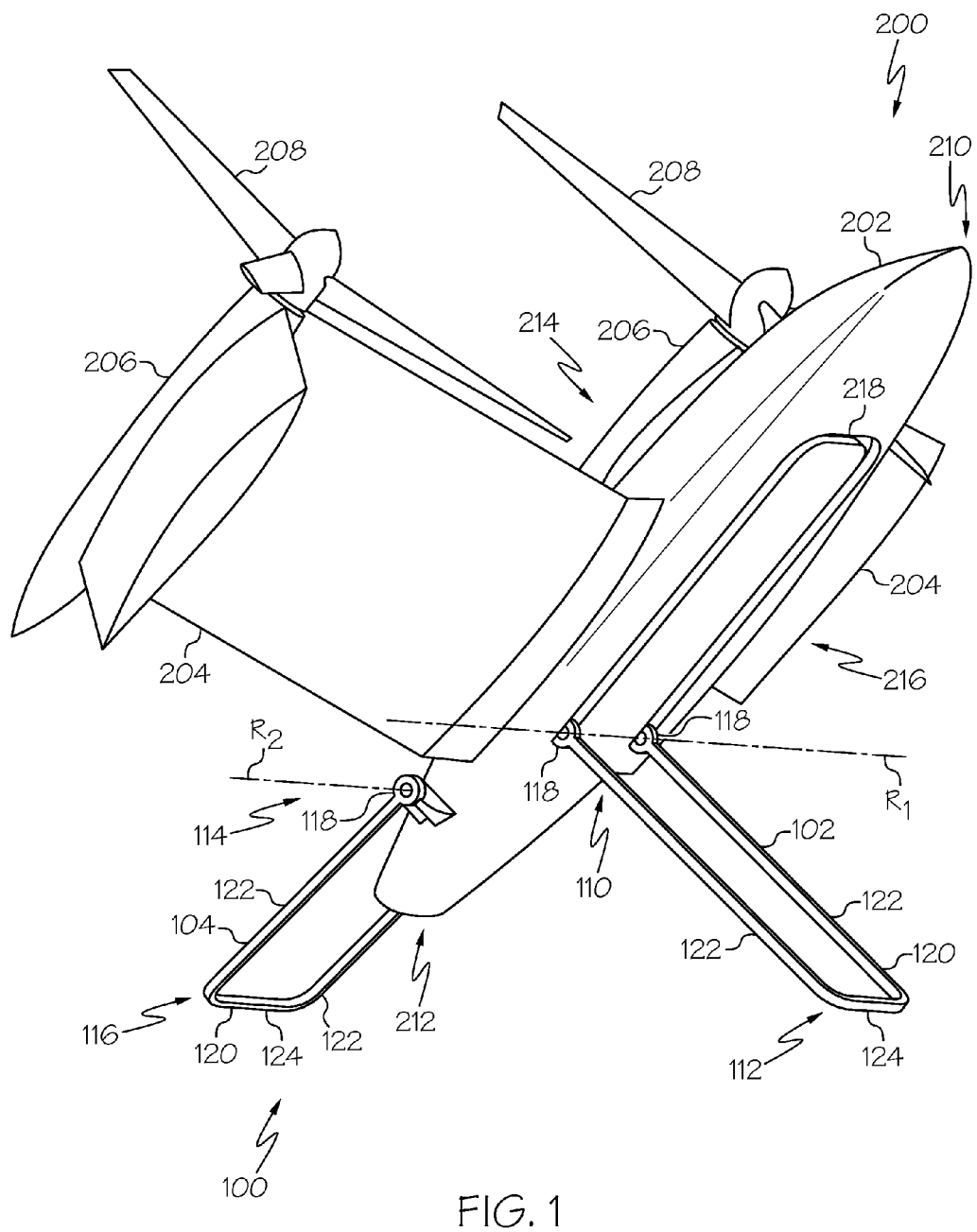
FIG. 1 is a schematic side and bottom perspective view of one embodiment of an aircraft provided with one embodiment of the disclosed multi-position landing gear.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIGS. 1-6 and 10, one embodiment of the disclosed multi-position landing gear, generally designated 100, is illustrated in use on an aircraft 200. The aircraft 200 may be any type of manned or unmanned aircraft including, but not limited to, fixed-wing aircraft, rotorcraft, and the like. As one specific, non-limiting example, the aircraft 200 may be an unmanned aerial vehicle ("UAV"), as illustrated by example. As another specific, non-limiting example, the aircraft 200 may be a tail-sitter or other type of VTOL aircraft.

In one example embodiment, the aircraft 200 may include a fuselage 202, wings 204 extending laterally from the fuselage 202, and at least one engine 206. As is known by those skilled in the art, the aircraft 200 may have other configurations. As one example, the aircraft 200 may be a flying wing (e.g., a tailless fixed-wing aircraft) that has no definite fuselage.

Figure 2:
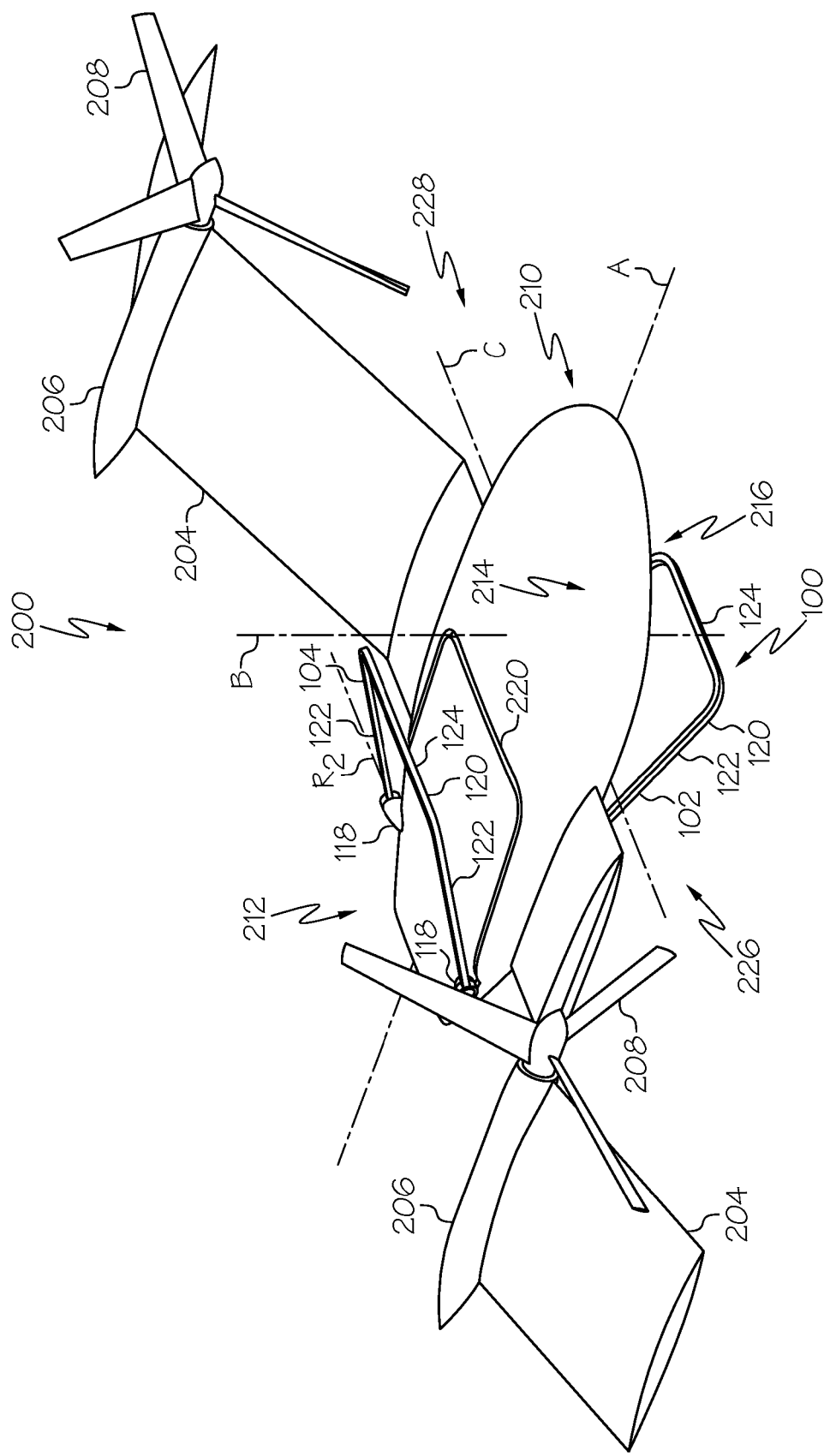
FIG. 2 is a schematic front and top perspective view of the aircraft provided with the multi-position landing gear.

The engine 206 may be any type of engine adapted to propel the aircraft 200. As one example, and as illustrated in FIG. 2, the aircraft 200 may be a propeller aircraft. For example, the engine 206 may be an internal combustion engine, a turbofan (e.g., turboprop) engine, or an electric motor that drives an aircraft propeller 208. As another example (not shown), the aircraft 200 may be a jet aircraft and the engine 206 may be a turbofan engine. The engine 206 may be contained or housed within an external cowling or nacelle mounted to the aircraft 200. As one example, and as illustrated by example, the engine 206 may be mounted to (e.g., over or under) the wings 204. In other examples (not shown), the engine 206 may be mounted to other areas of the aircraft 200, for example, to the fuselage 202.

Figure 3:
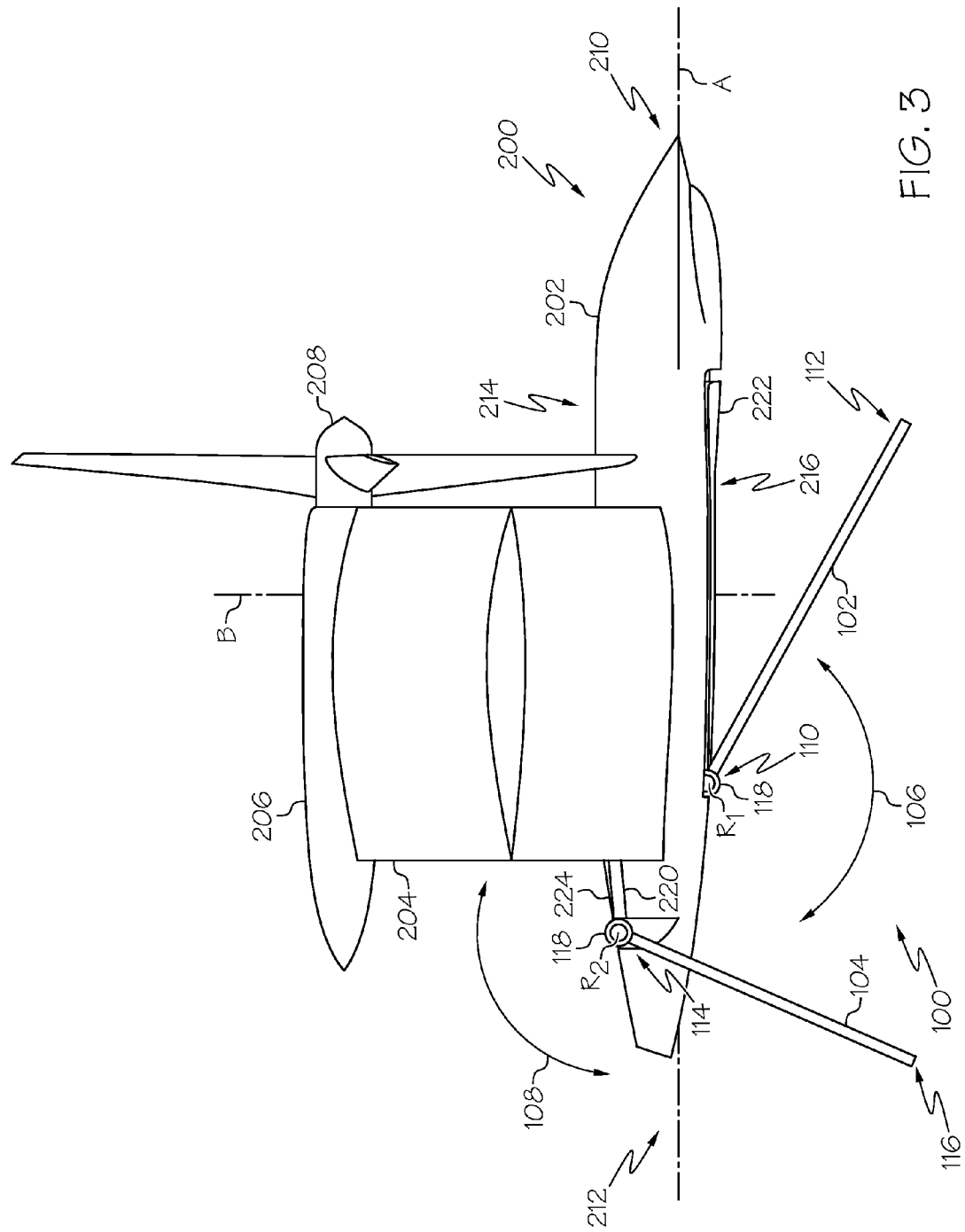
FIG. 3 is a schematic side elevational view of the aircraft provided with the multi-position landing gear, depicting the multi-position landing gear in a deployed position.

As best illustrated in FIG. 2, the aircraft 200 (e.g., the fuselage 202) may include a longitudinal (e.g., center) axis A, a normal (e.g., vertical) axis B, and a lateral axis C (FIG. 3). The aircraft 200 (e.g., the fuselage 202) may include a forward end 210 and a longitudinally opposed aft end 212. As used herein, the terms "forward" and "aft" may be considered relative to a direction of movement of the aircraft 200. The aircraft 200 (e.g., the fuselage 202) may include a right side 226 and a laterally opposed left side 228. The aircraft 200 (e.g., the fuselage 202) may include a top side 214 and a normally opposed bottom side 216.

Referring again to FIGS. 1-6 and 10, the multi-position landing gear 100 may include a first landing skid 102 operatively coupled to the aircraft 200 and a second landing skid 104 operably coupled to the aircraft 200. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of a lower-numbered item (e.g., a "first" item) and/or a higher-numbered item (e.g., a "third" item).

In one example embodiment, as best illustrated in FIGS. 1-6, the first landing skid 102 may be a bottom side landing skid associated with (e.g., disposed on) the bottom side 216 of the aircraft 200 (e.g., the fuselage 202) and the second landing skid 104 may be a top side landing skid associated with (e.g., disposed on) the top side 214 of the aircraft 200 (e.g., the fuselage 202) (e.g., the first landing skid 102 may be normally opposed to the second landing skid 104).

Figure 10:
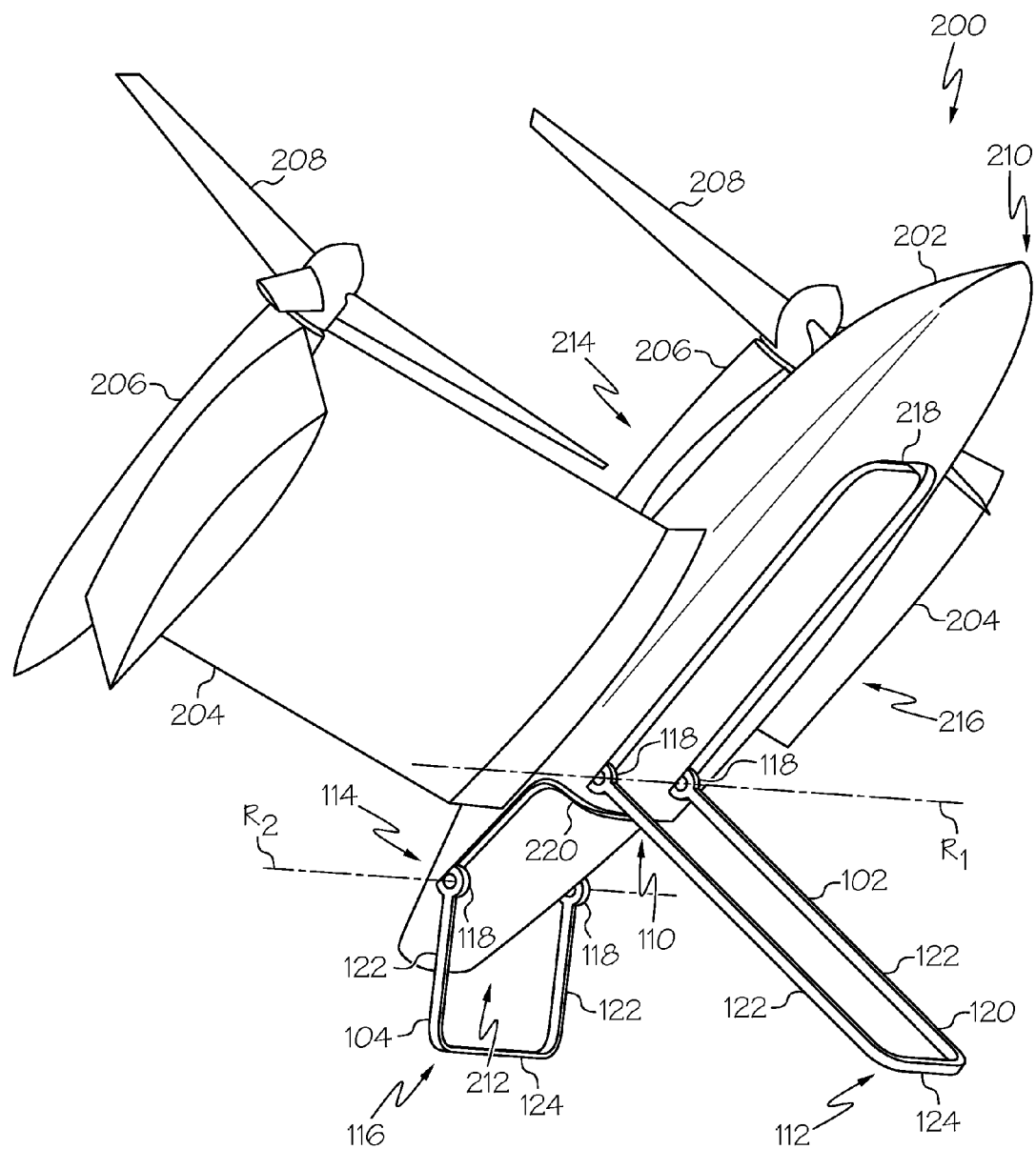
FIG. 10 is a schematic side and bottom perspective view of another embodiment of the aircraft provided with another embodiment of the disclosed multi-position landing gear.

In another example embodiment, as best illustrated in FIG. 10, the first landing skid 102 may be a bottom side landing skid associated with (e.g., disposed on) the bottom side 216 of the aircraft 200 (e.g., the fuselage 202) and the second landing skid 104 may also be a bottom side landing skid associated with (e.g., disposed on) the bottom side 216 of the aircraft 200.

The first landing skid 102 and the second landing skid 104 may be rotatable relative to the aircraft 200. As one example, and as best illustrated in FIGS. 1-6, the first landing skid 102 may be rotatable relative to the bottom side 216 of the aircraft 200 (e.g., fuselage 202) and the second landing skid 104 may be rotatable relative to the top side 214 of the aircraft 200 (e.g., fuselage 202). As another example, and as best illustrated in FIG. 10, the first landing skid 102 and the second landing skid 104 may be rotatable relative to the bottom side 216 of the aircraft 200 (e.g., fuselage 202).

Referring to FIGS. 1-6 and 10, the first landing skid 102 may include a first end 110 and an opposed second end 112. The first end 110 of the first landing skid 102 may be rotatably coupled to the aircraft 200 (e.g., the fuselage 202). In one example embodiment, and as best illustrated in FIGS. 1-6 and 10, the first end 110 of the first landing skid 102 may be rotatably coupled to the bottom side 216 of the aircraft 200.

The second landing skid 104 may include a first end 114 and an opposed second end 116. The first end 114 of the second landing skid 104 may be rotatably coupled to the aircraft 200. In one example embodiment, and as best illustrated in FIGS. 1-6, the first end 114 of the second landing skid 104 may be rotatably coupled to the top side 214 of the aircraft 200 (e.g., the fuselage 202). In another example embodiment, and as best illustrated in FIG. 10, the first end 114 of the second landing skid 104 may be rotatably coupled to the bottom side 216 of the aircraft 200 (e.g., the fuselage 202).

In one example embodiment, the first landing skid 102 may be spaced apart (e.g., along the longitudinal axis A) (FIG. 2) from the second landing skid 104. As one example, as best illustrated in FIGS. 1-6 and 10, the second landing skid 104 (e.g., the first end 114 of the second landing skid 104) may be positioned proximate (e.g., at or near) the aft end 212 of the aircraft 200. As another example, the second landing skid 104 (e.g., the first end 114 of the second landing skid 104) may be longitudinally spaced a distance away from the second end 212 of the aircraft 200 (e.g., toward the forward end 210 of the aircraft 200). Other positions of the first landing skid 102 and the second landing skid 104 (e.g., along the longitudinal axis A) (FIG. 2) are also contemplated. For example, the first landing skid 102 and/or the second landing skid 104 may be positioned more toward the forward end 210 or the aft end 212 of the aircraft 200 (e.g., the fuselage 202).

Those skilled in the art will recognize that the position of the first landing skid 102 (e.g., an attachment point of the first landing skid 102 on the bottom side 216) along the longitudinal axis A (FIG. 2) and/or the position of the second landing skid 104 (e.g., an attachment point of the second landing skid 104 on the top side 214 or bottom side 216) along the longitudinal axis A may depend on various factors including, but not limited to, they type of aircraft 200, the clearance required for rotation of the first landing skid 102 and/or the second landing skid 104, the amount of rotation required for desired for the first landing skid 102 and/or the second landing skid 104, and the like.

Referring to FIGS. 1-3 and 10, the first landing skid 102 may be at least partially rotatable about a first axis of rotation $R_1$ and the second landing skid 104 may be at least partially rotatable about a second axis of rotation $R_2$. The first axis of rotation $R_1$ and the second axis of rotation $R_2$ may extend laterally through the aircraft 200 (e.g., fuselage 202). For example, the first axis of rotation $R_1$ and the second axis of rotation $R_2$ may be perpendicular to the longitudinal axis A and parallel to the lateral axis C (FIG. 2) of the aircraft.

Referring to FIG. 3, as one example, the first landing skid 102 may rotate (e.g., in the direction of arrow 106) approximately 180-degrees about the first axis of rotation $R_1$. The second landing skid 104 may rotate (e.g., in the direction of arrow 108) approximately 270-degrees about the second axis of rotation $R_2$. As another example, the first landing skid 102 may rotate (e.g., in the direction of arrow 106) approximately 200-degrees about the first axis of rotation $R_1$. The second landing skid 104 may rotate (e.g., in the direction of arrow 108) approximately 250-degrees about the second axis of rotation $R_2$. Other rotational ranges of the first landing skid 102 and/or the second landing skid 104 are also contemplated.

Those skilled in the art will recognize that the rotational range of the first landing skid 102 about the first axis of rotation $R_1$ and/or the rotational range of the second landing skid 104 about the second axis of rotation $R_2$ may depend on various factors including, but not limited to, the type of aircraft 200, the size (e.g., length) of the first landing skid 102 and/or the second landing skid 104, the position of first landing skid 102 and/or the second landing skid 104, the amount of rotation required or desired for the first landing skid 102 and/or the second landing skid 104 (e.g., the amount of rotation deemed necessary for a particular aircraft 200 or application), and the like.

The first landing skid 102 and/or the second landing skid 104 may be operatively coupled to landing skid actuator mechanisms 118 (e.g., at the attachment points of the first landing skid 102 and/or the second landing skid 104). For example, the first end 110 of the first landing skid 102 may be operatively coupled to the landing skid actuator mechanisms 118 and the first end 114 of the second landing skid 104 may be operatively coupled to the landing skid actuator mechanisms 118.

The landing skid actuator mechanisms 118 may be any mechanism, device or assembly capable of rotating or translating the first landing skid 102 and/or the second landing skid 104 about the first axis of rotation $R_1$ and the second axis of rotation $R_2$, respectively, to control and set the rotation angle and/or position of the first landing skid 102 and/or the second landing skid 104 relative to the aircraft 200. As one example, each landing skid actuator mechanism 118 may include a motor and/or gear assembly (not shown) operatively coupled to the first landing skid 102 (e.g., at the first end 110) and/or the second landing skid 104 (e.g., at the first end 114). As another example, each landing skid actuator mechanism 118 may include a hydraulic piston (not shown) operative coupled to the first landing skid 102 and/or the second landing skid 104. As another example, each landing skid actuator mechanism 118 may include a smart-material actuator (e.g., shape memory alloy, artificial muscle, etc.) operatively coupled to the first landing skid 102 and/or the second landing skid 104.

The multi-position landing gear 100 (e.g., the landing skid actuator mechanisms 118) may provide multiple discrete positions for each of first landing skid 102 and/or the second landing skid 104 corresponding to desired aircraft orientations, attitudes and/or heights. For example, these include, but are not limited to, fully retracted during flight, vertical landing, and various refueling and maintenance positions including horizontal.

Figure 4:
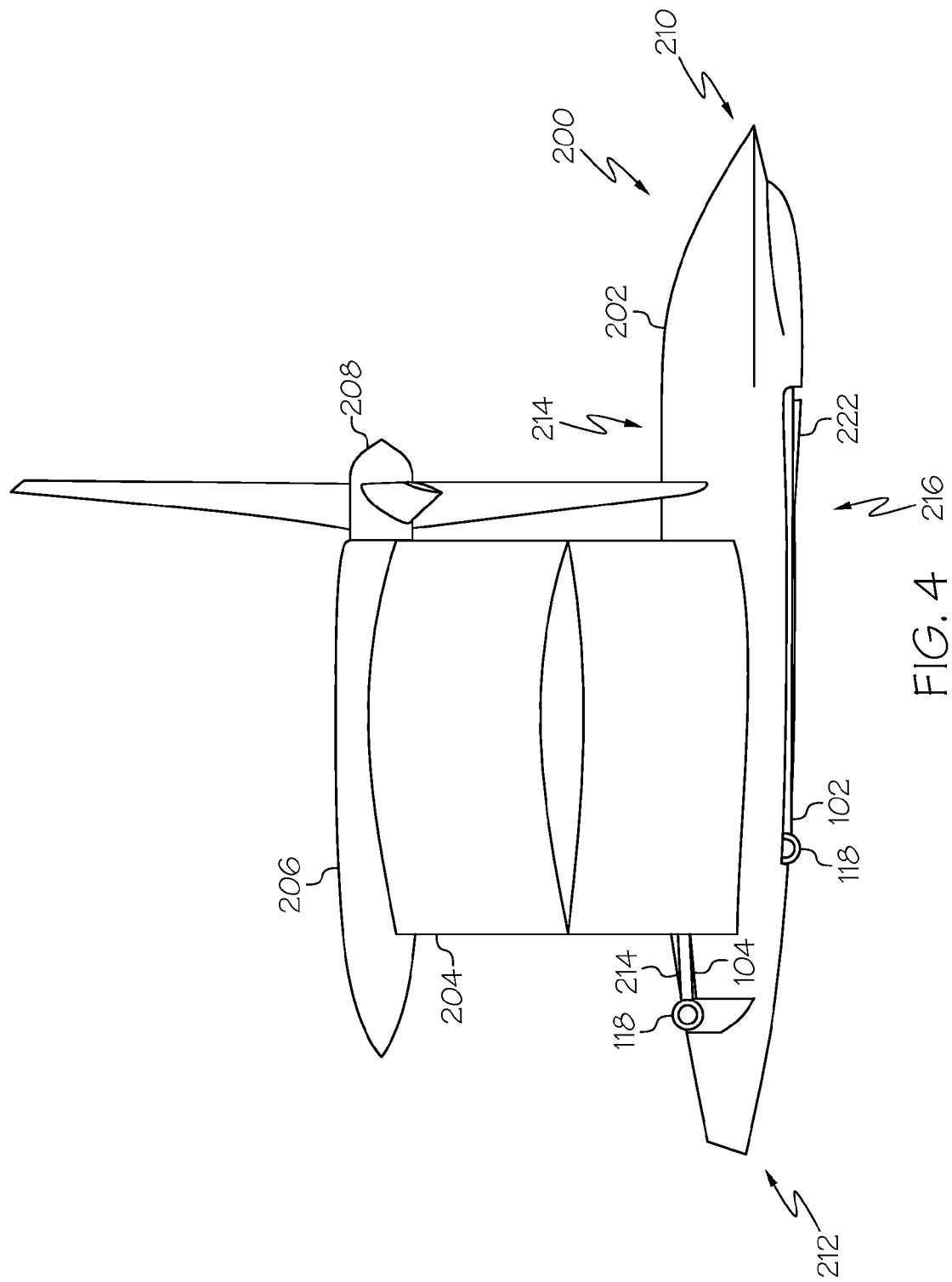
FIG. 4 is another schematic side elevation view of the aircraft provided with the multi-position landing gear, depicting the multi-position landing gear in a non-deployed position.

Referring to FIGS. 1-6 and 10, the aircraft 200 may include a first recess 218 and a second recess 220. The first recess 218 may be a groove or slot formed in the aircraft 200 (e.g., in the skin forming the fuselage 202) suitable sized and/or shaped to at least partially receive the first landing skid 102 when in a non-deployed or fully retracted, rotated position (e.g., during flight), as best illustrated in FIG. 4.

The second recess 220 may be a groove or slot formed in the aircraft 200 (e.g., in the skin forming the fuselage 202) suitable sized and/or shaped to at least partially receive the second landing skid 102 when in a non-deployed or fully retracted, rotated position (e.g., during flight), as best illustrated in FIG. 4.

In one example embodiment, as best illustrated in FIGS. 1-6 and 10, the first recess 218 may be a groove or slot formed in the bottom side 216 of the aircraft 200 (e.g., the fuselage 202). For example, the first recess 218 may completely receive the first landing skid 102 when rotated to a non-deployed position, such that the first landing skid 102 is positioned within a bottom surface 222 of the aircraft 200 (e.g., the fuselage 202) to reduce drag.

In one example embodiment, and as best illustrated in FIGS. 1-6, the second recess 220 may be a groove or slot formed in the top side 214 of the aircraft 200 (e.g., the fuselage 202). For example, the second recess 220 may completely receive the second landing skid 104 when rotated to a non-deployed position, such that the second landing skid 104 is positioned within a top surface 224 of the aircraft 200 (e.g., the fuselage 202) to reduce drag.

In another example embodiment, and as best illustrated in FIG. 10, the second recess 220 may be a groove or slot formed in the bottom side 216 of the aircraft 200 (e.g., the fuselage 202). For example, the second recess 220 may completely receive the second landing skid 104 when rotated to a non-deployed position, such that the second landing skid 104 is positioned within a bottom surface 222 of the aircraft 200 (e.g., the fuselage 202) to reduce drag.

Those skilled in the art will recognize that for a low-speed aircraft 200, the first recess 218 and/or the second recess 220 may not be necessary. For example, the first landing skid 102 and/or the second landing skid 104 may be stored flat against the fuselage 202 (e.g., the bottom surface 222 or top surface 224) or very close to it. Further, a high-speed aircraft 200 may include the first recess 218 and/or the second recess 220 and may also include small doors and/or covers (not shown) deployable over the recesses 218, 220.

The first landing skid 102 may rotate (e.g., about first axis of rotation $R_1$ in the direction of arrow 106) (FIG. 3) from the non-deployed position, as illustrated in FIG. 4, to various deployed positions, as illustrated in FIGS. 8A-8F and 9A-9C. For example, rotation of the first landing skid 102 may move the second end 112 of the first landing skid 102 between the first end 210 and the second end 212 of the aircraft 200.

The second landing skid 104 may rotate (e.g., about second axis of rotation $R_2$ in the direction of arrow 108) (FIG. 3) from the non-deployed position, as illustrated in FIG. 4, to a various deployed positions, as illustrated in FIGS. 8A-8F and 9A-9C. For example, rotation of the second landing skid 104 may move the second end 116 of the second landing skid 104 between the first end 210 and the second end 212 of the aircraft 200.

Referring to FIGS. 1, 2 and 10, in one example embodiment, the first landing skid 102 and/or the second landing 104 may include a generally U-shaped bar 120. For example, the first landing skid 102 may include a pair of parallel longitudinal support members 122 extending from the first end 110 to the second end 112 of the first landing skid 102 and a lateral support member 124 extending between the longitudinal support members 122 at the second end 112 of the first landing skid 102.

Similarly, the second landing skid 104 may include a pair of parallel longitudinal support members 122 extending from the first end 114 to the second end 116 of the second landing skid 104 and a lateral support member 124 extending between the longitudinal support members 122 at the second end 116 of the second landing skid 104.

Accordingly, the first recess 218 formed in the bottom surface 222 of the aircraft 200 (e.g., the fuselage 202) may include a generally U shape suitable to receive the U-shaped bar 120 of the first landing skid 102. The second recess 220 formed in the top surface 224 or the bottom surface 222 of the aircraft 200 (e.g., the fuselage 202) may include a generally U shape suitable to receive the U-shaped bar 120 of the second landing skid 104.

Figure 5:
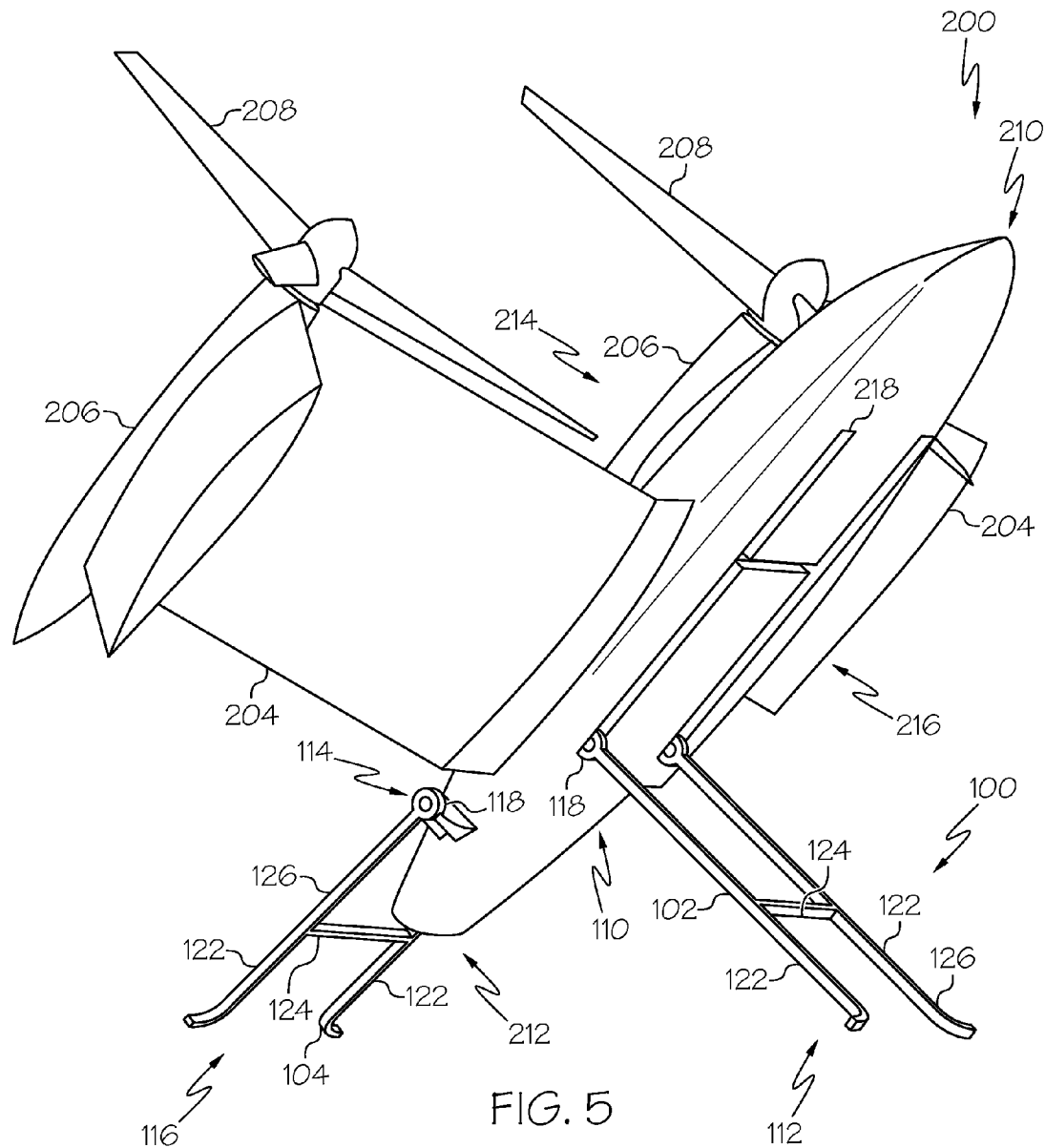
FIG. 5 is a schematic side and bottom perspective view of the aircraft provided with another embodiment of the disclosed multi-position landing gear.

Referring to FIG. 5, in another example embodiment, the first landing skid 102 and/or the second landing 104 may include a generally H-shaped bar 126. For example, the first landing skid 102 may include a pair of parallel longitudinal support members 122 extending from the first end 110 to the second end 112 of the first landing skid 102 and a lateral support member 124 extending between the longitudinal support members 122 between the first end 110 and the second end 112 of the first landing skid 102 (e.g., proximate a middle location of the longitudinal support members 122).

Similarly, the second landing skid 104 may include a pair of parallel longitudinal support members 122 extending from the first end 114 to the second end 116 of the second landing skid 104 and a lateral support member 124 extending between the longitudinal support members 122 between the first end 114 and the second end 116 of the second landing skid 104 (e.g., proximate a middle location of the longitudinal support members 122).

Accordingly, the first recess 218 formed in the bottom surface 222 of the aircraft 200 (e.g., the fuselage 202) may include a generally H shape suitable to receive the H-shaped bar 126 of the first landing skid 102. The second recess 220 formed in the top surface 224 or the bottom surface 222 of the aircraft 200 (e.g., the fuselage 202) may include a generally H shape suitable to receive the H-shaped bar 126 of the second landing skid 104.

Optionally, each of the longitudinal support member 122 (e.g., of the first landing skid 102 and/or the second landing skid 104) may be flared outward at the second end 112 of the landing skid 102, 104 to spread apart the contact points with a landing surface.

While the first landing skid 102 and the second landing skid 104 are illustrated in FIGS. 1, 2, 5 and 10 as having the same shape (e.g., both the first landing skid 102 and the second landing skid 104 including U-shaped bars 120 in FIGS. 1, 2 and 10 and both the first landing skid 102 and the second landing skid 104 including H-shaped bars 126 in FIG. 5), those skilled in the art will appreciate that the first landing skid 102 and the second landing skid 104 may have different shapes (e.g., the first landing skid 102 including the H-shaped bar 126 and the second landing skid 104 including the U-shaped bar 120).

The U-shaped bar 120 or the H-shaped bar 126 of the first landing skid 102 and the second landing skid 104 may have any cross-sectional shape, including, but not limited to, circular, square, triangular and the like.

The first landing skid 102 and/or the second landing skid 104 (e.g., the U-shaped bar 120 and/or the H-shaped bar 126) may made from a sufficiently resilient material to curve or flex upon landing in order to attenuate landing loads or crash loads, thus, reducing or eliminating damage to the aircraft 200. As one general, non-limiting example, the first landing skid 102 and/or the second landing skid 104 may be constructed of aerospace materials. As one specific, non-limiting example, the first landing skid 102 and/or the second landing skid 104 may be constructed of metal or metal alloy, such as 7075 Aluminum, 6065 Aluminum, and the like. As another specific, non-limiting example, the first landing skid 102 and/or the second landing skid 104 may be constructed of plastic, such as polyethylene terephthalate ("PETE"), high-density polyethylene ("HDPE"), low-density polyethylene ("LDPE"), and the like. As yet another specific, non-limiting example, the first landing skid 102 and/or the second landing skid 104 may be constructed of composite materials, such as fiber-reinforced plastic ("FRP"), graphic fiber-reinforced plastic ("GFRP"), carbon fiber-reinforced polymer ("CFRP"), glass-reinforced plastic (e.g., fiberglass), Kevlar-reinforced plastic, and the like.

The lateral positions of the first end 110 (e.g., of longitudinal support members 122) of the first landing skid 102 and/or the lateral positions of the first end 114 (e.g., of longitudinal support members 122) of the second landing skid 104 relative to a center of the aircraft 200 (e.g., the fuselage 202) may vary depending upon various factors including, but not limited to, the type of aircraft 200, the size (e.g., width) of the first landing skid 102 and/or the second landing skid 104, the amount of rotation required or desired for the first landing skid 102 and/or the second landing skid 104, and the like. For example, the attachment points of the longitudinal support members 122 (e.g., at the first end 110 of the first landing skid 102 and/or the first end 114 of the second landing skid 104) may be positioned proximate (e.g., at or near) the sides 226, 228 of the aircraft 200, spaced laterally inward from the sides 226, 228 of the aircraft 200, positioned on the sides 226, 228 of the aircraft 200 or some combination thereof.

Figure 6:
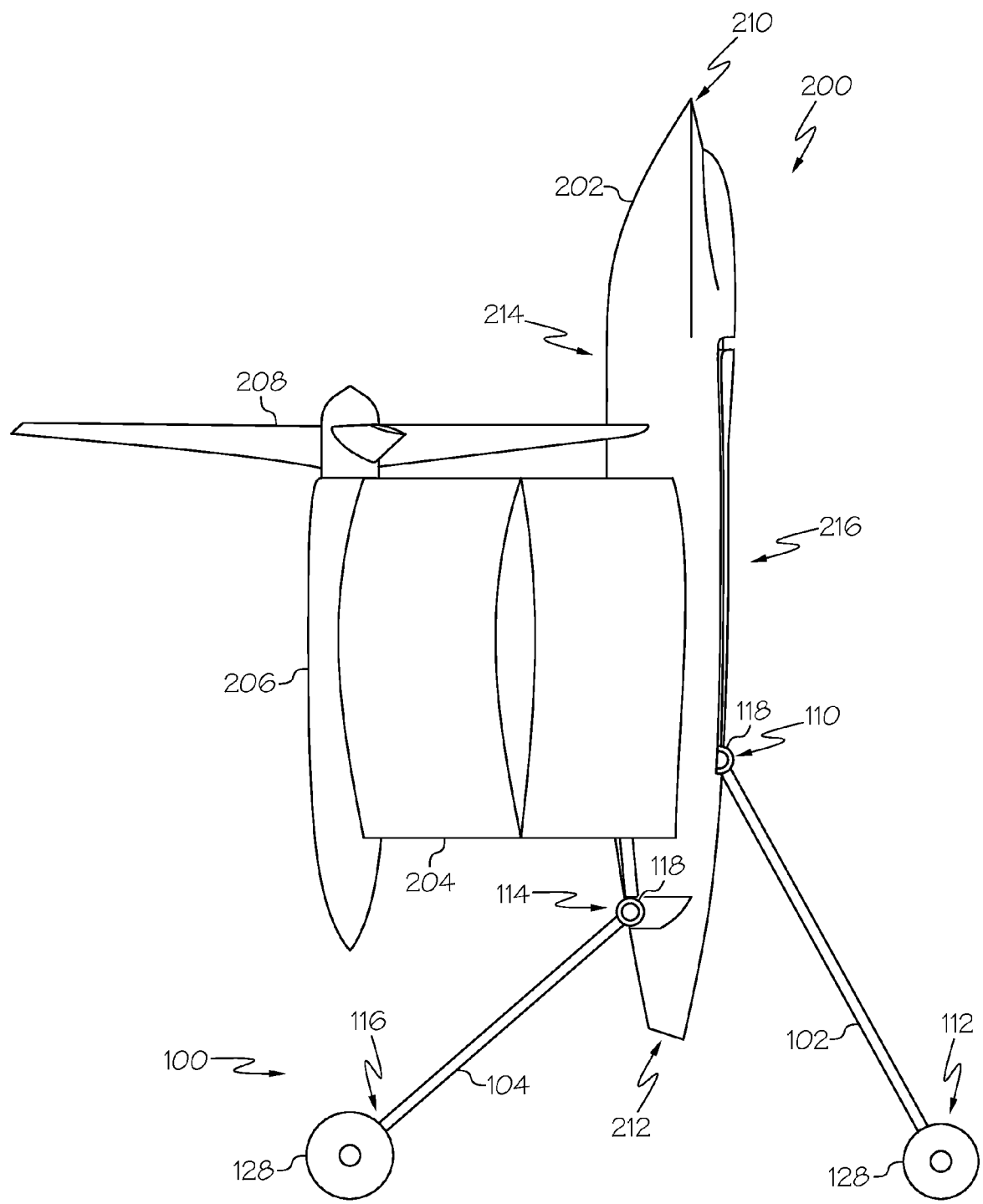
FIG. 6 is a schematic side elevational view of the aircraft provided with another embodiment of the disclosed multi-position landing gear.

Referring to FIG. 6, taxiing devices 128 may be coupled to the first landing skid 102 and/or the second landing skid 104 to facilitate mobility (e.g., taxiing) of the aircraft 200. As one example, the taxiing devices 128 may be permanently connected (e.g., installed) on the first landing skid 102 and/or the second landing skid 104. As another example, the taxiing devices 128 may be removably connected to the first landing skid 102 and/or the second landing skid 104 and only removed for maintenance and/or repair. As yet another example, the taxiing devices 128 may be removably connected (e.g., temporarily) to the first landing skid 102 and/or the second landing skid 104 during ground operations. The taxiing device 128 may be coupled (e.g., clipped or otherwise mechanically secured) to the second end 112 of the first landing skid 102 and the taxiing device 128 may be coupled (e.g., clipped or otherwise mechanically secured) to the second end 116 of the second landing skid 104.

As one example, and as illustrated in FIG. 6, the taxiing device 128 may include wheels for ground landing or takeoff or easier movement of the aircraft 200 on the ground (e.g., within a hangar or on a hangar ramp). As another example (not shown), the taxiing device 128 may include skis for snow landing or takeoff or easier movement of the aircraft 200 on snow covered ground. As yet another example (not shown), the taxiing device 128 may include floats (e.g., pontoons) for water landing or takeoff or easier movement of the aircraft 200 on the water.

Accordingly, the disclosed multi-position landing gear 100 may facilitate orienting and reorienting the aircraft 200 to various different positions, for example, for takeoff, landing and/or maintenance. Thus, the multi-position landing gear 100 allows the aircraft 200 to be oriented in multiple stable positions (e.g., a horizontal position, a vertical position, a position between horizontal and vertical, etc.) using a single set of landing gear. As the first landing skid 102 and the second landing skid 104 rotate (e.g., articulate) through their range of rotation, a plurality of different aircraft orientations and/or positions may be achieved within the range rotation at different times. Such position reorientation may be achieved without the need of external support equipment or tools (e.g., an overhead crane). Such reorientation (e.g., from a horizontal position to a vertical position) may also be used to change the footprint of the aircraft 200, for example, when stored on a ship.

As one example, the aircraft 200 may land in a first orientation (e.g., a vertical position as illustrated in FIG. 6)

and may takeoff in a second orientation (e.g., a horizontal position as illustrated in FIG. 3). Rotation of the first landing skid 102 and the second landing skid 104 may reorient the aircraft 200 from the first orientation to the second orientation.

As another example, the aircraft 200 may land in a first orientation (e.g., a horizontal position as illustrated in FIG. 3) and may takeoff in a second orientation (e.g., a vertical position as illustrated in FIG. 6). Rotation of the first landing skid 102 and the second landing skid 104 may reorient the aircraft 200 from the first orientation to the second orientation.

As another example, the aircraft 200 may be in a first orientation (e.g., a vertical position as illustrated in FIG. 6 or a horizontal position as illustrated in FIG. 3). Rotation of the first landing skid 102 and the second landing skid 104 may reorient the aircraft 200 from the first orientation to the second orientation (e.g., a position between vertical and horizontal as illustrated in FIG. 1). Such reorientation of the aircraft 200 may position the aircraft 200 at various different heights and/or angles (e.g., relative to the landing/takeoff surface) to facilitate access to different portions of the aircraft 200 (e.g., for maintenance access, mission store access, supply store access, etc.).

Figure 7:
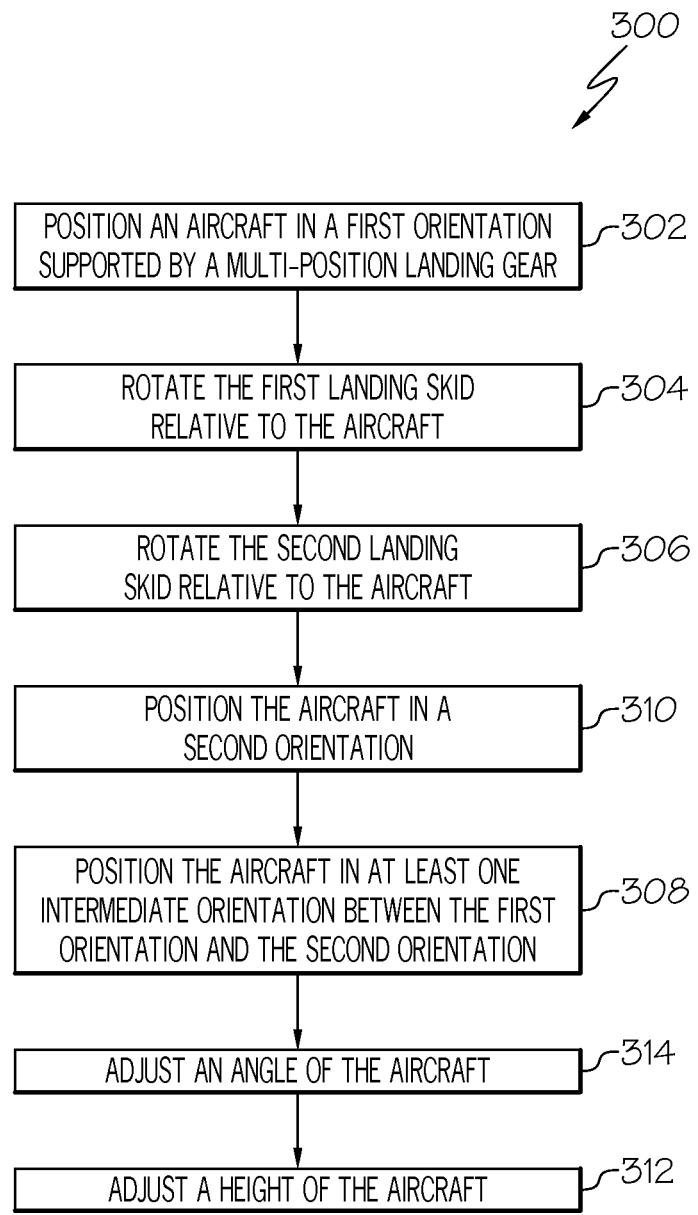
FIG. 7 is a flow diagram of one embodiment of the disclosed method for transitioning an aircraft between a plurality of orientations.

Referring to FIG. 7, and with reference to FIG. 8 (FIGS. 8A-8F), also disclosed is one embodiment of the method, generally designated 300, for transitioning the aircraft 200 between a plurality of orientations 400. Additional steps may be included in the disclosed method 300 without departing from the scope of the present disclosure.

FIGS. 8A-8F illustrate the disclosed method 300 for transitioning the aircraft 200 from a first orientation 402 (e.g., the aircraft 200 being in a generally vertical position) (FIG. 8A) to a second orientation 404 (e.g., the aircraft 200 being in a generally horizontal position) (FIG. 8F) by progressively orienting the aircraft 200 through various intermediate orientations 406, 408, 410, 412 (e.g., the aircraft 200 being in various position between vertical and horizontal) with the multi-position landing gear 100. However, the disclosed method 300 may equally transition the aircraft 200 from the second orientation 404 (e.g., the aircraft 200 being in a generally horizontal position) (FIG. 8F) to the first orientation 402 (e.g., the aircraft 200 being in a generally vertical position) (FIG. 8A) by progressively orienting the aircraft 200 through various intermediate orientations 412, 410, 408, 406 (e.g., the aircraft 200 being in various position between horizontal and vertical) with the multi-position landing gear 100.

As shown at block 302, the method 300 may begin with the step of positioning the aircraft 200 in the first orientation 402 (e.g., the generally vertical position), as illustrated in FIG. 8A. The aircraft 200 may be supported in the first orientation 402 by the multi-position landing gear 100. For example, the first landing skid 102 and the second landing skid 104 may be at a suitable rotated position to position the aircraft 200 in the first orientation 402.

As shown at blocks 304 and 306, the first landing skid 102 may be rotated relative to the aircraft 200 (e.g., in the direction of arrow 106 about the first axis of rotation $R_1$) (FIG. 3) and the second landing skid 104 may be rotated relative to the aircraft 200 (e.g., in the direction of arrow 108 about the second axis of rotation $R_2$) (FIG. 3).

As shown at block 308, the first landing skid 102 may be rotated relative to the aircraft 200 and the second landing skid 104 may be rotated relative to the aircraft 200 to progressively reorient the aircraft 200 through the various intermediate orientations 406, 408, 410, 412, as illustrated in FIGS. 8B-8E. For example, the first landing skid 102 may be progressively rotated toward the second end 212 of the aircraft 200 and the second landing skid 104 may be progressively rotated toward the first end 210 of the aircraft 200 to position the aircraft 200 in the each of the intermediate orientations 406, 408, 410, 412.

In one example implementation, rotation of the first landing skid 102 and/or the second landing skid 104 may occur concurrently or synchronously. In another example implementation, rotation of the first landing skid 102 and/or the second landing skid 104 may occur non-concurrently or asynchronously.

As shown at block 314, an angle of the aircraft 200 relative to the surface 414 may be adjusted. Incremental rotation of the first landing skid 102 and/or the second landing skid 104 may position the aircraft 200 in the various intermediate orientations 406, 408, 410, 412 (e.g., various positions between vertical and horizontal), as illustrated in FIGS. 8B-8E. For example, incremental rotation of first landing skid 102 and/or the second landing skid 104 may position the aircraft 200 at various angles relative to the (e.g., landing/takeoff) surface 414 when in the intermediate orientations 406, 408, 410, 412. The position of the aircraft 200 when in the intermediate orientations 406, 408, 410, 412 may facilitate access to various portions of the aircraft 200, such as during maintenance, service, payload and supply access, etc.

Figure 8C:
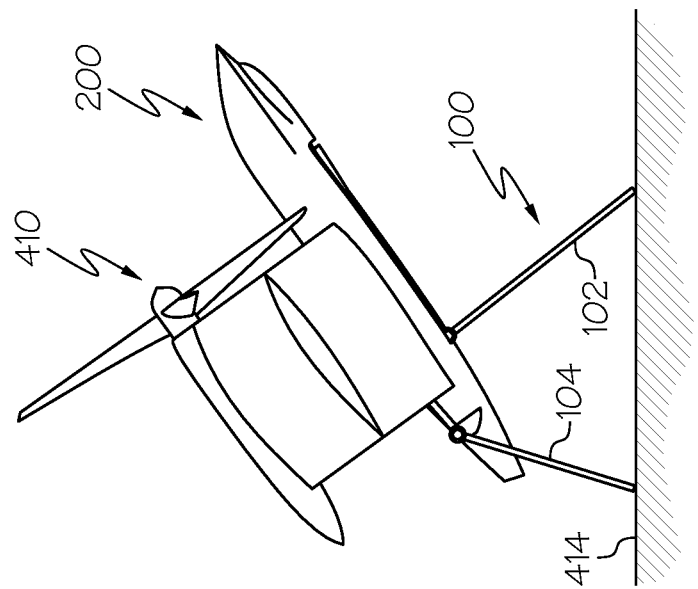
FIG. 8 (FIGS. 8A-8F) are side elevational views of the aircraft provided with the disclosed multi-position landing gear illustrating the transitioning steps of the method shown in FIG. 7.
Figure 8D:
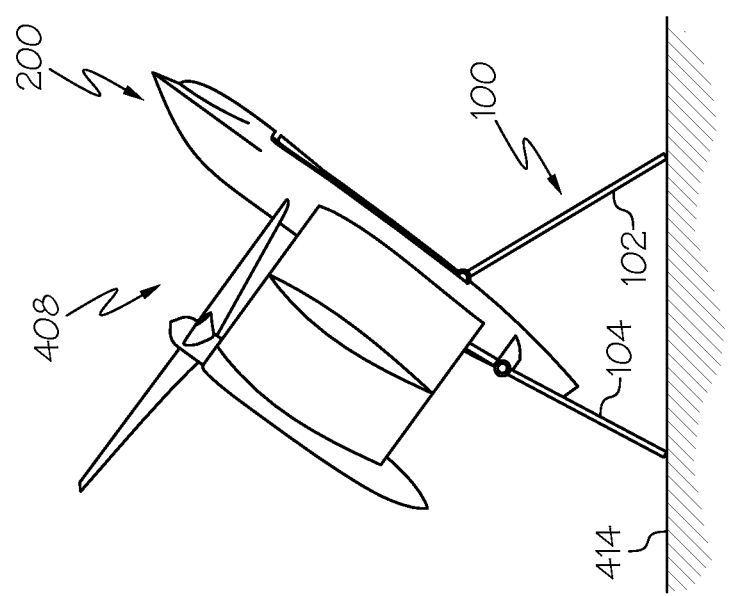
Figure 8F:
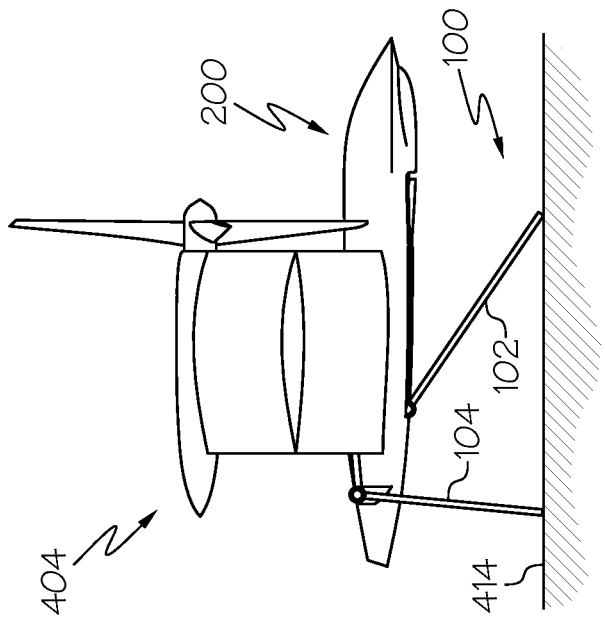
Figure 8E:
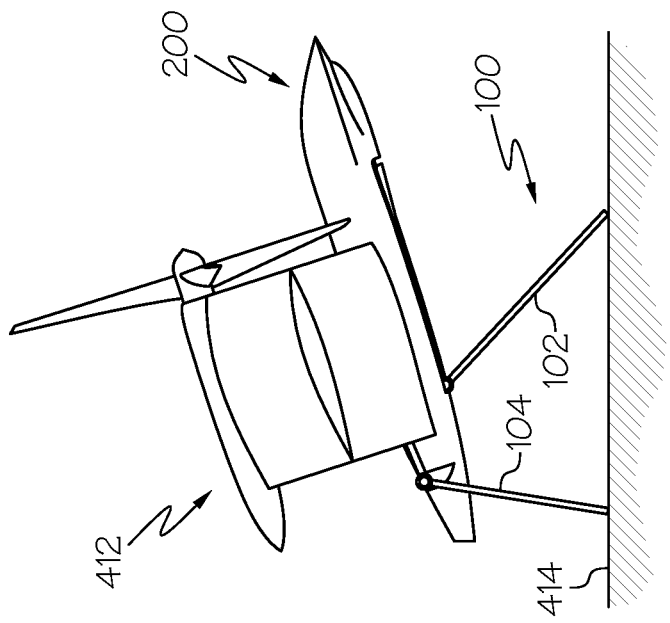

As shown at block 310, the first landing skid 102 may continue to be rotated (e.g., in the direction of arrow 106 about the first axis of rotation $R_1$) (FIG. 3) and the second landing skid 104 may continue to be rotated (e.g., in the direction of arrow 108 about the second axis of rotation $R_2$) (FIG. 3) to position the aircraft 200 in the second orientation 404 (e.g., the generally horizontal position), as illustrated in FIG. 8F.

Figure 9A:
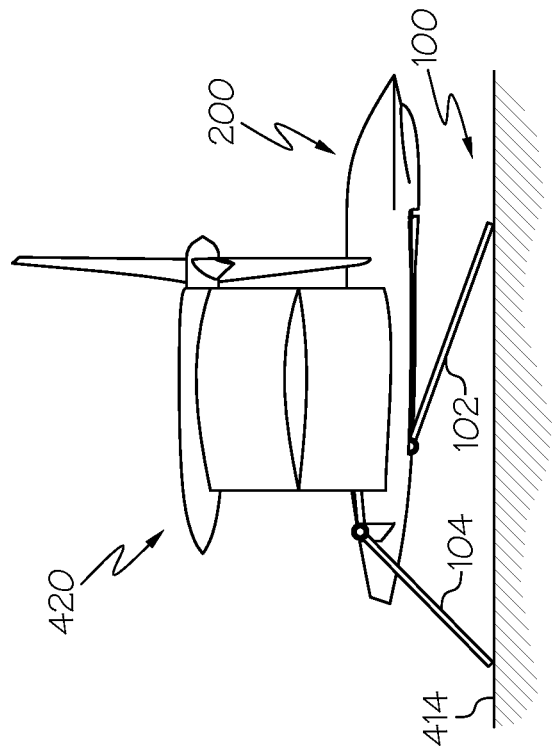
FIG. 9 (FIGS. 9A-9C) are side elevational views of the aircraft provided with the disclosed multi-position landing gear illustrating the height adjustment steps of the method shown in FIG. 7.
Figure 9B:
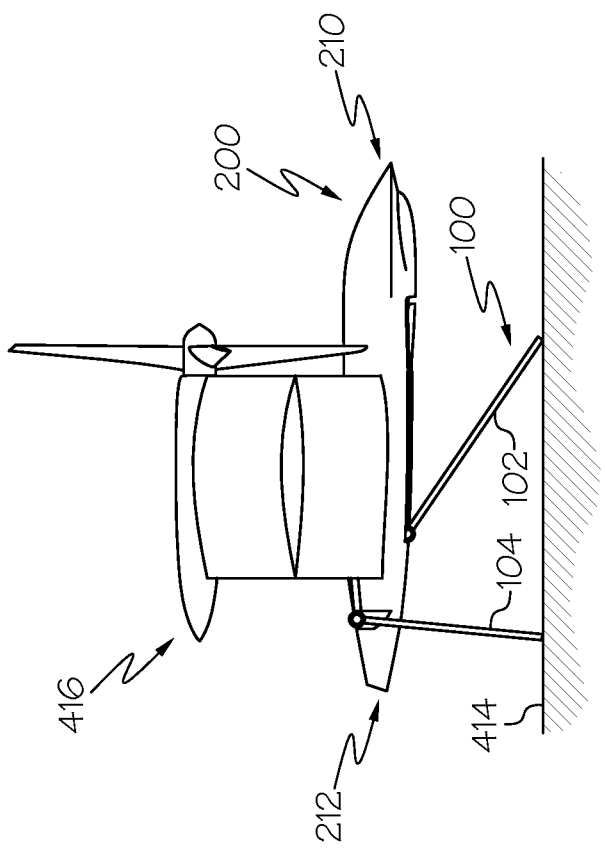

Referring to FIG. 7, and with reference to FIG. 9 (FIGS. 9A-9C), a height of the aircraft 200 relative to the surface 414 may be adjusted, as shown at block 312.

FIGS. 9A-9C illustrate the method 300 step of adjusting the height of the aircraft 200 (block 312) from a first height 416 (FIG. 9A) to a second height 418 (FIG. 9C) by progressively orienting the aircraft 200 through various intermediate heights (only intermediate height 420 is illustrated in FIG. 9B) with the multi-position landing gear 100. However, the disclosed step may equally transition the aircraft 200 from the second height 418 to the first height 416 by progressively orienting the aircraft 200 through various intermediate heights 420 with the multi-position landing gear 100.

Adjusting the height of the aircraft 200 (block 312) may include positioning the aircraft 200 at the first height 416, as illustrated in FIG. 9A. The aircraft 200 may be supported at the first height 416 by the multi-position landing gear 100. For example, the first landing skid 102 and the second landing skid 104 may be at a suitable rotated position to position the aircraft 200 at the first height 416. While the aircraft 200 is illustrated in FIGS. 9A-9C being in the second orientation (e.g., generally horizontal), those skilled in the art will recognize that the aircraft 200 may also be in the first orientation (e.g., generally vertical) during the height adjustment step (block 310).

The first landing skid 102 may be rotated (e.g., in the direction of arrow 106 about the first axis of rotation $R_1$) (FIG. 3) and the second landing skid 104 may be rotated (e.g., in the direction of arrow 108 about the second axis of rotation $R_2$) (FIG. 3) to progressively reorient the aircraft 200 through the various intermediate heights 420, as illustrated in FIG. 9B. For example, the first landing skid 102 may be progressively rotated toward the first end 210 of the aircraft 200 and the second landing skid 104 may be progressively rotated toward the first end 210 of the aircraft 200 to position the aircraft 200 in the each of the intermediate heights 420.

In one example implementation, rotation of the first landing skid 102 and/or the second landing skid 104 may occur concurrently or synchronously. In another example implementation, rotation of the first landing skid 102 and/or the second landing skid 104 may occur non-concurrently or asynchronously.

The first landing skid 102 may continue to be rotated (e.g., in the direction of arrow 106 about the first axis of rotation $R_1$) (FIG. 3) and the second landing skid 104 may continue to be rotated (e.g., in the direction of arrow 108 about the second axis of rotation $R_2$) (FIG. 3) to position the aircraft 200 at the second height 418, as illustrated in FIG. 9C.

Figure 11:
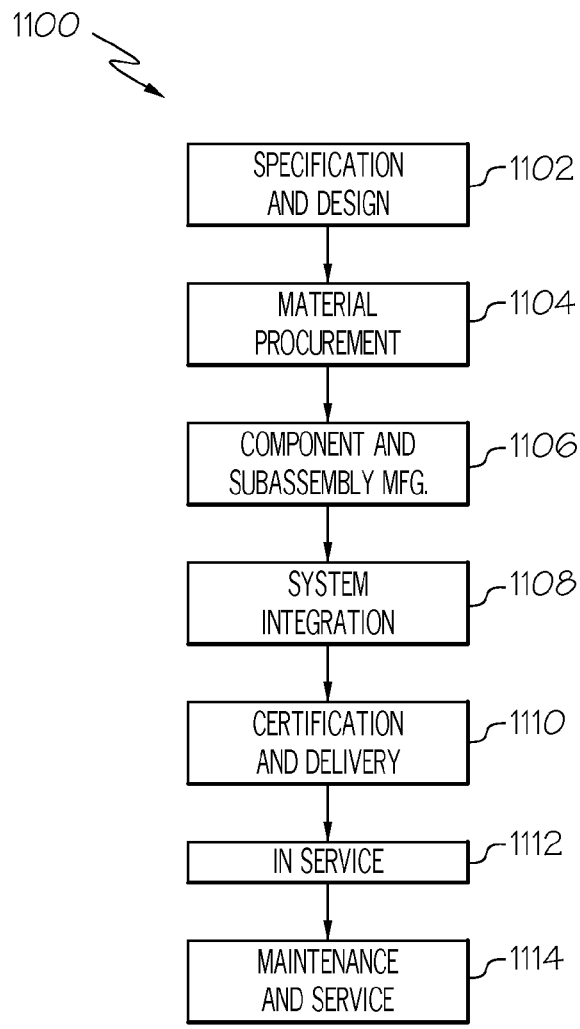
FIG. 11 is a block diagram of aircraft production and service methodology.
Figure 12:
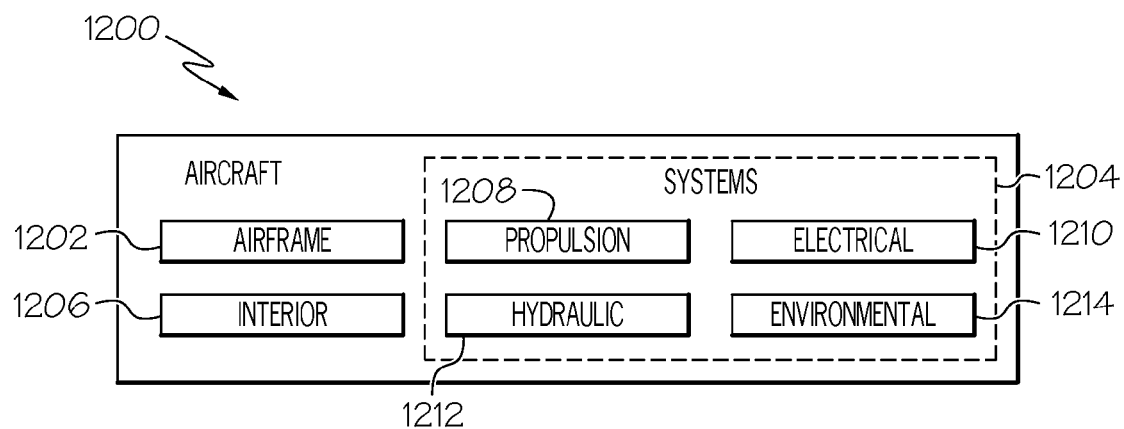
FIG. 12 is a schematic illustration of an aircraft.

Examples of the present disclosure may be described in the context of an aircraft manufacturing and service method 1100 as shown in FIG. 11 and an aircraft 1200 as shown in FIG. 12. During pre-production, the illustrative method 1100 may include specification and design, as shown at block 1102, of the aircraft 1200 and material procurement, as shown at block 1104. During production, component and subassembly manufacturing, as shown at block 1106, and system integration, as shown at block 1108, of the aircraft 1200 may take place. Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, the aircraft 1200 produced by illustrative method 1100 (FIG. 11) may include airframe 1202 with a plurality of high-level systems 1204 and interior 1206. Examples of high-level systems 1204 may include one or more of propulsion system 1208, electrical system 1210, hydraulic system 1212, and environmental system 1214. Any number of other systems may be included. In addition to the aircraft 1200, the principles disclosed herein may apply to other vehicles (e.g., space vehicles, drones, satellites, etc.).

The apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus, method, or combination thereof may be utilized during production stages (blocks 1106 and 1108), for example, by substantially expediting assembly of or reducing the cost of aircraft 1200. Similarly, one or more examples of the apparatus or method realizations, or a combination thereof, may be utilized, for example and without limitation, while aircraft 1200 is in service (block 1112) and/or during the maintenance and service stage (block 1114).

Although various embodiments of the disclosed multi-position landing gear and method have been shown and described, modifications may occur to those skilled in the art upon reading the specification. The present application includes such modifications and is limited only by the scope of the claims.

What is claimed is:

1. A multi-position landing gear for an aircraft comprising:
   a first landing skid disposed on a bottom side of said aircraft; and
   a second landing skid disposed on one of a top side or said bottom side of said aircraft,
   wherein said first landing skid and said second landing skid are rotatable relative to said aircraft, and
   wherein rotation of said first landing skid relative to said aircraft and said second landing skid relative to said aircraft transitions an orientation of said aircraft from an approximately vertical orientation to an approximately horizontal orientation and from said approximately horizontal orientation to said approximately vertical orientation.

2. The multi-position landing gear of claim 1 wherein said first landing skid is rotatably coupled to said aircraft about a first axis of rotation perpendicular to a longitudinal axis of said aircraft, and wherein said second landing skid is rotatably coupled to said aircraft about a second axis of rotation perpendicular to said longitudinal axis of said aircraft.

3. The multi-position landing gear of claim 1 further comprising skid actuator mechanisms operably coupled to said first landing skid and said second landing skid to rotate said first landing skid and said second landing skid relative to said aircraft.

4. The multi-position landing gear of claim 1 wherein said first landing skid is spaced away from said second landing skid along a longitudinal axis of said aircraft.

5. The multi-position landing gear of claim 1 wherein said first landing skid comprises a range of rotation of approximately between 180-degrees and 200-degrees.

6. The multi-position landing gear of claim 1 wherein said second landing skid comprises a range of rotation of approximately between 250-degrees and 270-degrees.

7. The multi-position landing gear of claim 1 wherein said first landing skid and said second landing skid each comprises a U-shaped bar.

8. The multi-position landing gear of claim 1 wherein said first landing skid and said second landing skid each comprises an H-shaped bar.

9. The multi-position landing gear of claim 1 wherein said first landing skid and said second landing skid each comprises one of a U-shaped bar or an H-shaped bar.

10. The multi-position landing gear of claim 1 further comprising taxiing devices removably coupled to said first landing skid and said second landing skid.

11. An aircraft comprising:
   a fuselage comprising a longitudinal axis, a top side and a bottom side;
   wings extending from said fuselage;
   at least one engine coupled to at least one of said fuselage and said wings;
   a first landing skid rotatably coupled to said bottom side of said fuselage; and
   a second landing skid rotatably coupled to one of said top side or said bottom side of said fuselage, wherein controlled rotation of said first landing skid about said bottom side of said aircraft and said second landing skid about said one of said top side or said bottom side of said aircraft transitions an orientation of said aircraft from an approximately vertical orientation to an approximately horizontal orientation and from said approximately horizontal orientation to said approximately vertical orientation.

12. The aircraft of claim 11 further comprising skid actuator mechanisms operably coupled to said first landing skid and said second landing skid to rotate said first landing skid about a first axis of rotation perpendicular to said longitudinal axis and said second landing skid about a second axis of rotation perpendicular to said longitudinal axis.

13. The aircraft of claim 11 wherein said aircraft further comprises a forward end and a longitudinally opposed aft end, wherein said second landing skid is positioned proximate said aft end of said aircraft, and wherein said first landing skid is spaced away from said second landing skid toward said forward end.

14. The aircraft of claim 11 wherein said first landing skid comprises a range of rotation of approximately between 180-degrees and 200-degrees, and wherein said second landing skid comprises a range of rotation of approximately between 250-degrees and 270-degrees.

15. The aircraft of claim 11 wherein said first landing skid and said second landing skid each comprises one of a U-shaped bar or an H-shaped bar.

16. The aircraft of claim 11 further comprising at least one of a first recess formed in said bottom side of said fuselage to receive said first landing skid; and a second recess formed in one of said top side or said bottom side of said fuselage to receive said second landing skid.

17. A method for transitioning an aircraft between a plurality of orientations, said method comprising:

positioning said aircraft in one of an approximately vertical orientation or an approximately horizontal orientation supported by a multi-position landing gear, said multi-position landing gear comprising a first landing skid disposed on a bottom side of said aircraft and a second landing skid disposed on one of a top side or a bottom side of said aircraft, wherein said first landing skid and said second landing skid are rotatable relative to said aircraft;

when in said approximately vertical orientation, rotating said first landing skid and said second landing skid relative to said aircraft to transition said aircraft from said approximately vertical orientation to said approximately horizontal orientation; and when in said approximately horizontal orientation, rotating said first landing skid and said second landing skid relative to said aircraft to transition said aircraft from said approximately horizontal orientation to said approximately vertical orientation.

18. The method of claim 17 further comprising positioning said aircraft in at least one intermediate orientation between said approximately vertical orientation and said approximately horizontal orientation in response to at least one of rotating said first landing skid relative to said aircraft and rotating said second landing skid relative to said aircraft.

19. The method of claim 17 further comprising adjusting an angle of said aircraft in response to at least one of rotating said first landing skid relative to said aircraft and rotating said second landing skid relative to said aircraft.

20. The method of claim 17 further comprising adjusting a height of said aircraft in response to at least one of rotating said first landing skid relative to said aircraft and rotating said second landing skid relative to said aircraft.

* * * * *